(12) United States Patent
Malhotra

(10) Patent No.: US 10,934,627 B2
(45) Date of Patent: Mar. 2, 2021

(54) METHODS AND SYSTEMS FOR MAKING HYPOCHLORITE SOLUTION FROM REVERSE OSMOSIS BRINE

(71) Applicant: MALVI TECHNOLOGIES, LLC, Cedar City, UT (US)

(72) Inventor: Vinod Malhotra, Cedar City, UT (US)

(73) Assignee: MALVI TECHNOLOGIES, LLC, Cedar City, UT (US)

( * ) Notice: Subject to any disclaimer, the term of this patent is extended or adjusted under 35 U.S.C. 154(b) by 548 days.

(21) Appl. No.: 15/586,084

(22) Filed: May 3, 2017

(65) Prior Publication Data

US 2017/0321330 A1 Nov. 9, 2017

Related U.S. Application Data

(60) Provisional application No. 62/332,597, filed on May 6, 2016.

(51) Int. Cl.
| | | |
|---|---|---|
| C25B 1/26 | (2006.01) | |
| C02F 1/467 | (2006.01) | |
| C02F 1/461 | (2006.01) | |
| C25B 9/08 | (2006.01) | |
| C02F 103/08 | (2006.01) | |
| C02F 1/20 | (2006.01) | |
| C02F 1/44 | (2006.01) | |

(52) U.S. Cl.
CPC ............ *C25B 1/26* (2013.01); *C02F 1/4674* (2013.01); *C02F 1/46104* (2013.01); *C25B 9/08* (2013.01); *C02F 1/20* (2013.01); *C02F 1/441* (2013.01); *C02F 2103/08* (2013.01); *C02F 2201/4618* (2013.01); *C02F 2201/46115* (2013.01); *C02F 2201/46185* (2013.01); *Y02A 20/131* (2018.01)

(58) Field of Classification Search
CPC ..... C02F 1/76; C25B 1/24; C25B 1/26; C25B 1/265; C01B 11/06–066
See application file for complete search history.

(56) References Cited

U.S. PATENT DOCUMENTS

| | | | | |
|---|---|---|---|---|
| 1,944,803 | A * | 1/1934 | Ornstein ................. | C02F 1/763 137/88 |
| 3,223,242 | A * | 12/1965 | Murray ................. | C02F 1/4674 210/139 |
| 3,776,524 | A * | 12/1973 | Starke ................. | B01F 3/04099 366/262 |
| 2003/0098244 | A1* | 5/2003 | Ruhr ....................... | A61L 2/035 205/516 |
| 2005/0072687 | A1* | 4/2005 | Hubbard ................. | C01B 7/012 205/516 |
| 2012/0168378 | A1* | 7/2012 | Taniguchi ............ | B01D 61/022 210/650 |
| 2014/0311897 | A1* | 10/2014 | Jung ...................... | C02F 1/4674 204/263 |
| 2015/0345033 | A1* | 12/2015 | Blunn ....................... | C01B 7/03 423/488 |
| 2018/0291514 | A1* | 10/2018 | Lumetta ................... | C25B 9/08 |

OTHER PUBLICATIONS

S. Sachdeva et al. "Synthesis of Anion Exchange Polystyrene Membranes for the Electrolysis of Sodium Chloride" AIChE Journal Apr. 2008. vol. 54, No. 4 (Year: 2008).*

* cited by examiner

*Primary Examiner* — Louis J Rufo
(74) *Attorney, Agent, or Firm* — Dorsey & Whitney LLP

(57) ABSTRACT

Embodiments disclosed herein relate to methods and systems for producing and using hypochlorite from brine.

22 Claims, 1 Drawing Sheet

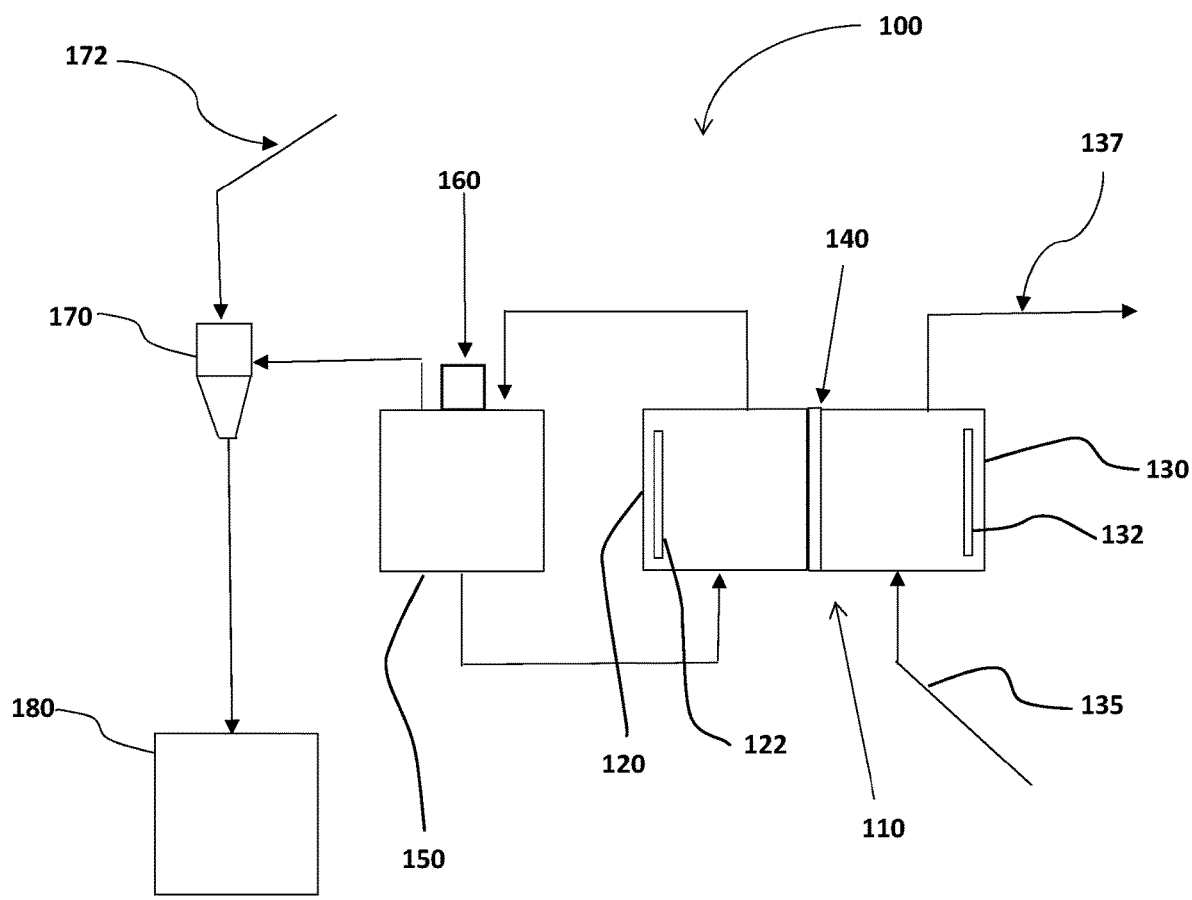

METHODS AND SYSTEMS FOR MAKING HYPOCHLORITE SOLUTION FROM REVERSE OSMOSIS BRINE

BACKGROUND

Sodium hypochlorite (optionally referred to herein as "hypochlorite" as dictated by context) is currently produced from two types of feed solutions, namely a manufactured salt solution and seawater. Hypochlorite made from a manufactured salt solution is primarily used for disinfecting drinking water and the hypochlorite made from seawater is primarily used for controlling and abating marine growth in process equipment, such as heat exchangers and ultrafiltration units. In the drinking water application, the concentration of hypochlorite produced is normally 8 grams per liter (g/l), from a feed of 30 g/l in salt concentration, and for the process equipment cleaning application it is usually less than about 2 g/l.

Undivided cells are universally used to produce hypochlorite for the above-noted applications. Pretreatment of the feed solution (e.g., softening to remove scaling components such as calcium and magnesium present in manufactured salt) is quite normal in the drinking water application before the feed solution is introduced into an electrochemical cell to produce hypochlorite. The salt consumption in conventional hypochlorite production is over three pounds of salt used per pound of sodium hypochlorite produced. The 3 lbs. of salt per pound of hypochlorite produced (3 lb./lb.) is an optimum consumption as the power cost, another important cost impacting factor involved in producing hypochlorite, has an inverse relationship to the salt consumption. The salt consumption of less than 3 lb./lb. of hypochlorite can be achieved to reduce the salt consumption and hence its cost by making a hypochlorite concentration higher than the 8 g/l. However, making the hypochlorite concentration above the 8 g/l hypo concentration in an undivided cell reduces the current efficiency of the operation drastically, partially because some of the produced hypochlorite is oxidized to chlorate. Such oxidation substantially increases the power cost and thus off-sets the advantage of the reduced salt consumption.

The salt purity—especially its bromide concentration—is extremely important because during the hypochlorite production process, all bromide in the feed salt solution is oxidized to bromate. If the bromide concentration is not low, the bromate amount resulting from it in the disinfected water is high, normally at concentrations greater than the levels allowed by the standard presently set at less than 10 parts per billion (ppb). The current efficiency in this method is low, as little as 60% to 70%. One of the reasons for the low efficiency is that some of the hypochlorite produced by the cell is further oxidized to higher oxides, chlorate and perchlorate. Currently, drinking water does not have a chlorate standard but that is likely to change in the future. Depending upon the standard established for chlorate, it could possibly be that the hypochlorite currently produced for drinking water use—from manufactured salt using methods available today—might not be able to meet the chlorate or perchlorate standards of the future.

Both the seawater and reverse osmosis ("RO") brine, where available, can be the free salt source, instead of manufactured salt, for making hypochlorite. Unfortunately, both sources have high levels of bromide and, for that reason, drinking water disinfected with the hypochlorite generated from the said sources using methods available today will not meet the bromate standard for drinking water. Ships and sea-bound vessels stock and store large quantities of manufactured salt because even though both the seawater and RO brine solutions—free chloride sources—are ubiquitous all around them to use as a salt source, the option to use them is currently not available because of the bromate standards currently required.

Seawater, as noted above, is used to make hypochlorite for abating and controlling marine growth in process equipment all over the world using bi-polar undivided cells and not for the drinking water application. Seawater has a high concentration of calcium and magnesium components. A hypochlorite solution generated by the cells is inherently basic and, for that reason, some calcium and magnesium in the feed solution is converted to hydroxide precipitates. The solid hydroxide precipitates settle and scale the cell equipment. Periodic shut down of the hypochlorite production operation is required to dissolve the solids using hydrochloric acid. Cleaning may be necessary for safety, equipment longevity, and smooth operation.

SUMMARY

Embodiments disclosed herein relate to methods and systems for producing hypochlorite. A method for producing hypochlorite is disclosed. The method includes providing a divided electrochemical cell. The method includes, with the divided electrochemical cell, electrochemically moving the chloride ions from a brine solution in a cathode compartment to an anolyte in an anode compartment of the divided electrochemical cell via an ion-selective membrane therebetween. The method includes oxidizing the chloride ions at an anode in the anode compartment to form a mixture of chlorine-containing gases including chlorine, hypochlorous acid, and hydrochloric acid. The method includes recirculating the anolyte including a salt solution through the anode compartment while a current is applied therein to produce the chlorine-containing gases. The method includes purging the chlorine-containing gases in the anolyte of the anode compartment with one or more of air or nitrogen to displace the chlorine-containing gases. The method includes combining the chlorine-containing gases displaced via purging with water to form hypochlorite.

A system for producing hypochlorite is disclosed. The system includes a divided electrochemical cell. The divided electrochemical cell includes an anode compartment having an anode, a cathode compartment having a cathode, and a selective membrane separating the anode compartment from the cathode compartment. The system includes a brine source in fluid communication with the cathode compartment. The system includes an anolyte feed tank in fluid communication with the anode compartment. The system includes an gas inlet in fluid communication with the anolyte feed tank, the gas inlet configured to provide a purge gas to an anolyte in the anolyte feed tank to drive off one or more chlorine-containing gases therein. The system includes an eductor fluidly coupled to the anolyte feed tank and configured to mix the chlorine-containing gases with a water supply. The system includes a water line operably coupled to the eductor, the water line configured to feed water through the eductor effective to combine the chlorine-containing gases into water passing through the water line to form hypochlorite.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

FIG. 1 is a flow diagram of a method of producing hypochlorite, according to at least one embodiment.

DETAILED DESCRIPTION

Embodiments disclosed herein relate to methods and systems for producing hypochlorite from brine (e.g., reverse osmosis brine, seawater, or wastewater brine, etc.). Embodiments disclosed herein provide cost-effective methods and systems, which have all or some of the following features. The methods and systems disclosed herein can use a free chloride source such as reverse osmosis ("RO") brine or seawater instead of manufactured salt to produce hypochlorite for drinking water meeting bromate, chlorate and perchlorate standards. The methods and systems disclosed herein do not require purchase of manufactured salt and equipment to dissolve it and soften the solution. The methods and systems disclosed herein do not cause scaling of equipment or electrodes and do not require periodic shut down of the system to acid-clean it. The methods and systems disclosed herein minimize waste generation and disposal. The methods and systems disclosed herein do not add more sodium to the water to be disinfected. The methods and systems disclosed herein use inexpensive material as the cathode. The methods and systems disclosed herein offer an option to potentially bottle hydrogen gas generated by the process. The methods and systems disclosed herein are amenable to producing commercial-grade hypochlorite and allow on-site and on-demand production and storage of weak hypochlorite solution, if necessary, instead of the minimum concentration of 8 g/l conventional methods are forced to produce for economic reasons. The methods and systems disclosed herein do not require dilution of the hydrogen gas generated by the process with air prior to its release (for safety reasons) as currently practiced. The methods and systems disclosed herein are able to deliver these benefits, which differentiate them from the commercial methods currently in use.

At least one embodiment of a system 100 for producing hypochlorite is schematically shown in FIG. 1. While FIG. 1 is described in terms of system components, FIG. 1 also serves as a flow diagram of a method of producing and/or using hypochlorite. The method uses a divided cell 110 including an anode compartment 120 having anode 122 therein, a cathode compartment 130 having a cathode 132 therein, and a selective membrane 140. The anode compartment 120 and the cathode compartment 130 are separated by the selective membrane 140 (e.g., an anion-selective or chloride ion-selective membrane) disposed therebetween. Suitable anodes 122 can include a dimensionally stable anode ("DSA") or an equivalent. Suitable anodes 122 can be a coated or uncoated anode including titanium, niobium, tantalum, zirconium, a platinum group metal (e.g., platinum or ruthenium), oxides of any of the foregoing, alloys of any of the foregoing, combinations of any of the foregoing, or any other anode material. Suitable cathode materials can include coated or uncoated stainless steel, nickel, iron, alloys of any of the foregoing, graphite, combinations of any of the foregoing, or any other cathode material. In some embodiments, it is desirable to use anode or cathode materials and configurations that are durable and have a long life which may reduce downtime in the system for maintenance.

Suitable selective membranes 140 can include ion-selective membranes such as anion-selective membranes or chloride ion-selective membranes. Such selective membranes 140 can include a coated or uncoated ceramic, glass, polymer, or a combination of any of the foregoing. Suitable selective membranes can include commercially available organic anion-selective membranes, such as a coated polyvinyl chloride ("PVC") membrane.

In some embodiments, one or more of the anode 122, the cathode 132, or the selective membrane 140 can be substantially planar. In some embodiments, one or more of the anode 122, the cathode 132, or the selective membrane 140 can be substantially cylindrical, such as each having a concentrically increasing dimension (e.g., an inner cylindrical anode separated from an outer cylindrical cathode by a cylindrical membrane therebetween). For example, in some embodiments, the divided cell 110 may be configured as a spiral wound cell having an anode and cathode compartment separated by a spiral wound ion-selective membrane therebetween.

Anolyte feed to the anode compartment 120 may initially include a one-time prepared initial solution of manufactured salt, which is fed from an anolyte feed tank 150 into the anode compartment 120 via a feed conduit (not shown) therebetween. The initial solution may be recycled through the anode compartment 120 of the cell 110 back to the anolyte feed tank 150 via a product conduit (not shown) therebetween during the course of electrolysis. The initial salt solution can include sodium chloride either alone or in combination with other chloride salts. In some embodiments, the anolyte is a salt solution having a dissolved salt concentration greater than 1 g/l, or less than 300 g/l, such as about 1 g/l to about 300 g/l, about 1 g/l to about 150 g/l, about 5 g/l to about 100 g/l, about 10 g/l to about 80 g/l, about 25 g/l to about 75 g/l, about 40 g/l to about 60 g/l, about 50 g/l to about 100 g/l, about 2 g/l to about 20 g/l, about 5 g/l to about 25 g/l, about 50 g/l, or less than about 50 g/l.

Catholyte feed to the cathode compartment 130 is a once-through brine solution from a brine source 135 via a brine feed conduit (not shown). The brine source 135 can include one or more of an RO system, storage tank, or seawater pump. The brine solution can include an RO-brine solution, seawater, municipal waste, industrial production waste brine, or combinations thereof. The brine solution can include one or more dissolved salts such as sodium salts (e.g., NaCl), magnesium salts, calcium salts, potassium salts, any other salts found in RO brine or seawater, or combinations of any of the foregoing.

When power is applied to the electrodes of the cell 110, caustics (one or more of caustic salt (which dissociates) and/or a caustic solution, collectively or individually "caustics") are produced in the cathode compartment 130. As the current is applied to the anode and the cathode, electrolysis and oxidation takes place in the cell 110. During electrolysis, water is reduced at the cathode to produce hydroxyl ions and hydrogen gas. Alkali metals present in the brine solution combine with the hydroxyl ions to form their hydroxides. For example, sodium ions from the dissolved sodium chloride salts present in the brine are converted to caustics and chloride ions. The chloride ions are electrochemically moved from the cathode compartment 130 into an anode compartment 120 via the ion selective membrane 140 therebetween during electrolysis. Some of the free chloride ions in the brine feed (e.g., RO brine) in the cathode compartment 130 migrate to the anode compartment 120 of the cell 110 via the (anionic) selective membrane 140 (e.g., due to the difference in potential induced by current between the anode and cathode) where they are oxidized to produce chlorine-containing gas(es) (e.g., initially chlorine gas ($Cl_2$) and finally a mixture of chlorine gas, hypochlorous acid, and hydrochloric acid). The amount of chloride ions that migrate or the speed at which they move through the selective membrane depends on the current density of operation in the anode compartment 120 and/or cathode compartment 130 (e.g., about 155 ma/cm$^2$), and increase with an increase in current density. Suitable current densities include about 500 ma/cm$^2$ or less, such as about 1 ma/cm$^2$ to about 500 ma/cm$^2$, about 50 ma/cm$^2$ to about 400 ma/cm$^2$, about 100 ma/cm$^2$ to about 300 ma/cm$^2$, about 100 ma/cm$^2$ to about 200 ma/cm$^2$, about 150 ma/cm$^2$, about 155 ma/cm$^2$, or more than about 50 ma/cm$^2$.

At least some of the chlorine gas is hydrolyzed in the anode compartment 120. The hydrolysis of chlorine gas ($Cl_2$) produces hypochlorous and hydrochloric acids in the anode compartment 120. The solution containing the chlorine-containing gases (e.g., mixture of chlorine gas, hypochlorous acid, and hydrochloric acid) exiting the anode compartment 120 is received back in the feed tank 150 via the product conduit therebetween (not shown), where a nitrogen gas and/or air sparger 160 is housed to purge (e.g., sweep away) the chlorine-containing gases from the solution in the feed tank 150. The sparger can be operably coupled to or be disposed in the feed tank 150. The nitrogen or air carrying the oxidized chlorine-containing gases (e.g., mixture of chlorine gas, hypochlorous acid gas, and hydrochloric acid gas) may be mixed with part of the water to be disinfected in the eductor 170 to produce hypochlorite. The water to be disinfected can be supplied to the eductor 170 via a water line 172 fluidly coupled thereto. The water line 172 may be fluidly coupled to a water source to supply water to be treated to the eductor 170. For example, the water line 172 may be operably coupled to one or more of a potable water source, a reverse osmosis output (e.g., a permeate or reject of an reverse osmosis system), waste water supply, industrial brine source, seawater source, or any other water source. The chlorine-containing gases (and associated sparge gases) can be drawn, injected or admixed with at least a portion of a water source to be cleaned (or caustic solution to be treated in the case of commercial grade hypochlorite production) to form the hypochlorite or hypochlorite treated water. In such embodiments, the water (e.g., potable water, seawater, reverse osmosis brine) combined with the chlorine-containing gases (e.g., hypochlorite) in the eductor 170 may be used for drinking, bathing, cleaning process equipment, preventing marine growth in process equipment, etc. In some embodiments, the hypochlorite treated water may be retained for later use in product tank 180. In some embodiments, the hypochlorite may be retained (e.g., without combining the same with water or by adding minimal amounts of water to form a hypochlorite solution) for later use or sale. The hypochlorite is discharged into the product tank 180 and from there it is supplied to its users, such as for treating water (e.g., the RO permeate, seawater, wastewater, etc.). In some embodiments, the processes disclosed herein may be an on-demand process of producing hypochlorite and/or treating water with the same and the hypochlorite may be used to treat water on demand wherein the hypochlorite treated water is output to an end user via a product tank, a conduit (e.g., piping), or a water system. The eductor 170 can have a relatively high velocity flow of water (water to be treated) therethrough. The inner geometry of the eductor 170 and/or water line 172 (e.g., RO permeate line) coupled thereto can be modified to control the flow rate of the chlorine-containing gases (and sparge gases such as nitrogen and/or air) leaving the anolyte feed tank and into the eductor 170 and water supply. In some embodiments, the gases can be fed into an injector, which is configured to inject the gases into a water source to produce a hypochlorite solution and/or treat the water source. In some embodiments, such as when the anolyte flow is a once through flow of anolyte (e.g., not a recirculating flow of the same fluid), at least some of the chlorine-containing gases may not be purged from the anode compartment (e.g., from the anolyte or solution in the anode compartment). In such cases, the anolyte (solution) containing the dissolved chlorine-containing gases, exiting the anode compartment, can be used for non-drinking water applications, such as bathing, cleaning process equipment, preventing marine growth in process equipment, etc.

Using the hypochlorite in the eductor 170 or product tank 180, water from a contaminated or otherwise dirty water source (RO system, sea, etc.) can be disinfected to a residual level of 2 ppm hypochlorite or less on an on-demand basis. For example, hypochlorite from the product tank 180 can be combined with potable water to disinfect the potable water before its use. The hypochlorite solution can be drawn, injected, or admixed into potable water prior to end use. In some embodiments, the product in the product tank 180 can be the water that has been treated with hypochlorite sufficient to make the water safe to drink. The product in the product tank 180 can be substantially free of one or more of bromate, chlorate, or perchlorate.

The chloride ion concentration in the anolyte feed tank 150 does not change substantially during the operation. For example, the amount of chloride ions which are oxidized to chlorine in the anode compartment 120 (to make hypochlorite) are replaced by a substantially equal amount of chloride ions migrating from the brine feed (e.g., RO brine feed) in the cathode compartment 130 to the anode compartment 120 via the (anionic) selective membrane 140. Such chloride replacement enables the brine to act as a continually recharging source of chloride to produce hypochlorite.

Throughout the operation of the system 100, the pH of the anolyte solution remains acidic, unlike in the undivided cell operation where it is basic, and for that reason keeps the oxidized chloride in the chlorine, hypochlorous and hydrochloric forms. For example, the anolyte solution remains acidic due to the steady flow of chloride ions into the anode compartment (e.g., anolyte compartment) which are oxidized to chlorine gas, which dissociates to hydrochloric acid and hypochlorous acid. Hypochlorous acid has a very low dissociation constant and for that reason it does not dissociate to form hypochlorite ions. Accordingly, the formation of chlorate from hypochlorous acid chemically reacting with hypochlorite ions in the cell is avoided. The formation of perchlorate is also avoided as it requires presence of chlorate ions to produce perchlorate.

In the divided cells and methods disclosed herein, since an anion-selective membrane and pure salt solution (substantially devoid of calcium and magnesium ions) are used, and not a cation-selective membrane, the formation of precipitates in the interstices of the membrane is avoided (due to the lack of magnesium or calcium ions moving into the membrane which precipitate upon reaction with hydroxyl ions to clog the membrane) and, as a result, the cell voltage (and current efficiency) during the operation remains steady.

In an undivided cell operation, the solution is inherently basic and leads to the formation of sodium hypochlorite, which has a high dissociation constant and dissociates into separate sodium and hypochlorite ions. The presence of the hypochlorite ions leads to the formation of some chlorate as some hypochlorite ions chemically react with hypochlorous acid produced from dissociation of chlorine gas, the amount depending upon the operating parameters such as temperature, pH (basicity in undivided cells) of the solution, and hypochlorite concentration in the undivided cell. For example, beyond a 10 g/l concentration of hypochlorite, almost all the chloride oxidized in an undivided cell forms chlorate/perchlorate (due to reaction of hypochlorite and hypochlorous acid formed in the cell), reducing the current efficiency to almost zero. Thus, the highest concentration of the hypochlorite made from the manufactured salt in an undivided cell operating at 155 ma/cm$^2$ is inherently restricted to only about 8 g/l. Even at this concentration the current efficiency is low, only about 60% to 65%, which is a good economic compromise between the power and salt consumptions because of their inverse relationship to each other.

On the cathode compartment 130 side of the cell 110, feed of the catholyte is kept at a high enough flow rate to have only a minimal increase in its caustic concentration upon leaving the cell 110 via a waste outlet. The high flow rate ensures caustic concentration increase is low and consequently keeps the pH increase small (about 0.1 to about 1.0 pH) between the cathode feed stream and the cathode waste stream. Additionally, the amounts of calcium and magnesium hydroxides precipitates formed during the electrolysis are small as a result of the high flow rate and associated pH. Due to the extremely low concentration (e.g., about 0.001 moles per liter (mol/l) to about 0.005 mol/l) of the caustic (hydroxyl anions and sodium cations) relative to the chloride ion ($Cl^-$) concentration (e.g., about 0.85 mol/l to about 1.0 mol/l) in the cell 110, the hydroxyl ions give little or no competition to the chloride ions migrating from the cathode compartment 130 of the cell 110 to the anode compartment 120, making it possible to achieve high current efficiency (greater than about 70%, greater than about 80%, or greater than about 90% current efficiency). In some embodiments, the anolyte flow rate can be greater than, smaller than, or equal to the catholyte flow rate.

The high feed flow rate also provides high enough velocity in the cathode compartment 130 to flush away precipitates formed during the cell operation, obviating the need to shut it down for cleaning mineral scales with hydrochloric acid. The exiting waste solution, along with the hydrogen gas produced by the cell, can be discharged (from the cathode compartment 130) into a safe open outlet, such as a waste outlet 137 designated for discharging brine (e.g., into the ocean or a RO brine outlet). Such waste discharge can reduce or eliminate solids accumulation in the process equipment while allowing the safe discharge of the hydrogen gas to the atmosphere without air dilution. In some embodiments, during operation, electrical power to the anode and cathode may be temporarily terminated, while continuing to circulate the fluid through the anode compartment (e.g., anolyte such as dissolved salt solution) and once through brine flow through the cathode compartment (e.g., catholyte such as RO brine or seawater). In such embodiments, one or more pumps may continue to pump fluid through the anode compartment and/or cathode compartment, while electrolysis is temporarily halted. In such embodiments, the cathode compartment may be flushed of one or more solids or precipitates therein. In some embodiments, a system for producing hypochlorite may include computer controls to periodically halt electrolysis (e.g., turn of power to the anode and cathode) for a duration. In embodiments, the power may be terminated at preselected intervals. In some embodiments, the intervals may be 1 minute, 2 minutes, 5 minutes, 10 minutes 30 minutes, 1 hour, 2 hours, 4 hours, 8 hours, 12 hours, 1 day, 2 days, or 1 week. In some embodiments, the duration of time that passes between termination of power to the anode and cathode and reestablishment of power thereto may be 10 seconds or more, such as about 1 minute, about 2 minutes, about 5 minutes, about 10 minutes, about 30 minutes, about 1 hour, about 2 hours, or about 4 hours. Any combination of the intervals and durations may be used to periodically flush the cathode compartment of any precipitates or other impurities therein.

In the methods disclosed herein, the produced hypochlorite solution easily meets the bromate standard for the drinking water because the salt solution circulating in the anode compartment 120, where chloride is oxidized, remains basically a manufactured salt solution with no or extremely low bromide concentration throughout the duration of the operation, thus avoiding formation of hypobromide or bromate.

While the brine source and water source (to be cleaned) are shown in FIG. 1 as RO brine and RO permeate, respectively, it is understood that alternative brine and water sources can be used. For example, the water source can be RO permeate and the brine source can be RO brine; the brine source can be seawater and the water source to be cleaned can be from desalinated seawater; the brine can be from treated wastewater and the water source to be cleaned with the hypochlorite can be municipal water; or combinations of any of the foregoing.

In some embodiments, RO brine is preferred over the seawater for the chloride source because RO brine has higher chloride and total dissolved solids (TDS) concentrations, by as much as 50% more than the seawater. Due to the higher chloride and TDS concentrations, RO brine exhibits a higher electrical conductivity than the seawater. Such higher conductivity leads to a lower cell operating voltage than systems using seawater, and hence lower power consumption. Unlike the seawater, RO brine is pristine having passed through the RO membrane used in the RO process, and therefore it does not require filtration before use. Seawater salt concentration is not constant. It varies from sea to sea. That is, however, not the case with the RO brine generated from seawater by the reverse osmosis process. Its concentration basically stays the same as it is controlled and dictated by the reverse process operation. Accordingly, in some embodiments, seawater may be treated via reverse osmosis (or at least filtered) and then treated according to the methods disclosed herein.

The systems and methods herein are useful for both of hypochlorite's major applications: drinking water as well as marine-growth abatement and control in process equipment. Manufactured salt is not a consumable in the systems and methods disclosed herein, making it a very cost effective and attractive method for the drinking water application as compared to the conventional processes which rely on consumable manufactured salt solution(s) for a chloride source. The systems and methods herein are beneficial to ships and sea vessels (not to mention desalinization and water treatment in coastal communities) as stocking and storing of the large quantities of salt is avoided, saving cargo weight and space, advantages that can be more valuable to them than the cost of purchasing manufactured salt.

In a non-drinking application, such as controlling marine growth in process equipment or cleaning the membrane of an ultra-filtration unit used ahead of an RO system to produce potable water from seawater, bromate is a non-issue from an ingestion safety standard perspective. The methods and systems described herein can be used as-is or can be configured to adapt to a non-drinking application easily. For example, instead of using the pure salt (e.g., NaCl) solution recirculating in the anode compartment (e.g., anolyte compartment), the anolyte solution can be a once-through or recirculating seawater or RO brine. Unlike the seawater-generated hypochlorite solution using an undivided cell, the RO brine-generated hypochlorite solution would not cause equipment scaling as it is acidic and not basic, more pristine, electrically more conductive, and available in copious quantities without requiring filtration to generate it. In such embodiments, the anode compartment may be purged with a gas to flush the chlorine-containing gases therefrom (e.g., from the anolyte or brine solution in the anode compartment), or may be left unpurged. If purged, the chlorine-containing gases can be combined with potable water to form a hypochlorite-containing solution for drinking water applications (e.g., treating potable water to bring one or more contaminants therein into a safe drinking level). Even after purging, the brine solution (e.g., anolyte) of the anode compartment may retain at least some chlorine-containing gases and the brine solution may be used for non-drinking water applications. In such embodiments, the methods and systems disclosed herein can be used to simultaneously produce hypochlorite and/or solutions containing the same both for drinking and non-drinking water applications.

The systems and methods herein can also be used to produce commercial grade hypochlorite (e.g., sodium hypochlorite), and without using manufactured salt as a consumable. For example, the chlorinated gases swept by the nitrogen/air from solution in the anolyte tank 150 can be contacted (reacted) with a purchased caustic solution, instead of water to be disinfected as described above. By controlling the flow rate of the purchased caustic and/or the chlorinated gases/nitrogen/air mixture, (sodium) hypochlorite of the required strength (e.g., concentration) can be produced.

In some embodiments, methods of producing commercial grade hypochlorite, as noted above, may require purchased (or otherwise obtained) caustic to make concentrated hypochlorite. The purged chlorine-containing gases (e.g., mixture of chlorine and hydrochloric and hypochlorous acids) can be combined with the caustic (e.g., purchased caustic) to form commercial grade hypochlorite. In some embodiments, the concentration of a caustic solution can be more than about 0.01% caustic, less than about 50% caustic, or about 0.1% to about 50% caustic. In contrast to the methods disclosed herein, in the chlor-alkali process, salt is the purchased chemical, which is extensively pre-treated to remove its impurities, notably calcium and magnesium, to ppb levels at a great cost before its use. The caustic needed to make the hypochlorite in this case is produced by the process itself. In contrast to the chlor-alkali process, in the methods herein, the opposite is true. That is, caustic is the purchased chemical and salt is free. The salt in this case is already dissolved, and the salt solution does not require extensive and elaborate treatment prior to use, which is required in the chlor-alkali process.

In some cases, the disclosed systems and methods may be a more attractive option to produce commercial grade hypochlorite than the chlor-alkali process, such as where brine and inexpensive caustic solution are available.

In some embodiments, hydrogen gases produced at the catholyte side of the cell 110 can be captured. Capturing can include bottling or directing into a fuel system or cell. The captured hydrogen gas can be burned as a fuel. In some embodiments, at least some of the chlorine gases produced in the anolyte side of the cell 110 can be burned to produce hydrochloric acid. In some embodiments, at least some of the air or nitrogen purge gases can be recaptured and recycled through the system. Such capture and use of materials in the system can reduce waste and energy costs associated with the system.

While various aspects and embodiments have been disclosed herein, other aspects and embodiments are contemplated. The various aspects and embodiments disclosed herein are for purposes of illustration and are not intended to be limiting.

What is claimed is:

1. A method for producing hypochlorite, the method comprising:
    providing a divided electrochemical cell;
    with the divided electrochemical cell, electrochemically moving chloride ions from a brine solution in a cathode compartment to an anolyte in an anode compartment of the divided electrochemical cell via an ion-selective membrane therebetween, wherein the anolyte includes one or more chloride salts and the brine solution includes a plurality of dissolved salts therein including at least bromide ions, chloride ions, calcium ions, and magnesium ions, and the brine solution is cycled through the cathode compartment only one time;
    oxidizing the chloride ions at an anode in the anode compartment to form a mixture of one or more chlorine-containing gases including at least hypochlorous acid;
    recirculating the anolyte including a substantially pure salt solution through the anode compartment, while a current is applied therein to produce the mixture of one or more chlorine-containing gases;
    purging the chlorine-containing gases of anolyte of the anode compartment with one or more of air or nitrogen to displace the mixture of one or more chlorine-containing gases; and
    combining the mixture of one or more chlorine-containing gases displaced via purging with water to form hypochlorite.

2. The method of claim 1, further comprising injecting the hypochlorite into water to disinfect the water.

3. The method of claim 1, further comprising injecting the hypochlorite into water or another brine solution to produce hypochlorite-containing solutions for bathing, cleaning equipment, or preventing marine growth in equipment.

4. The method of claim 1, wherein:
    the divided electrochemical cell includes:
        the anode compartment having the anode,
        the cathode compartment having the cathode, and
        the ion-selective membrane separates the anode compartment from the cathode compartment; and
    electrochemically moving the chloride ions from the cathode compartment to the anode compartment via the ion-selective membrane includes passing the brine solution through the cathode compartment, while a current is applied to the anode and the cathode.

5. The method of claim 1, where the anode is a dimensionally stable anode.

6. The method of claim 1, wherein the anode, the cathode, and the selective membrane are substantially planar.

7. The method of claim 1, wherein the anode, the cathode, and the selective membrane are substantially cylindrical.

8. The method of claim 1, wherein the ion-selective membrane includes an organic anion-selective membrane.

9. The method of claim 1, wherein a brine solution flow rate through the cathode compartment is sufficiently large to maintain a change in a caustic concentration therein to about 0.1 pH to about 1 pH difference in a pH of the brine solution as the brine solution exits the cathode compartment than from when the brine solution enters the cathode compartment.

10. The method of claim 9, wherein an anolyte flow rate through the anode compartment is greater than or substantially equal to the brine solution flow rate.

11. The method of claim 9, wherein an anolyte flow rate through the anode compartment is smaller than the brine solution flow rate.

12. The method of claim 1, wherein the anolyte includes a salt solution having dissolved salt concentration greater than 1 g/l.

13. The method of claim 1, further comprising injecting displaced chlorine-containing gases into a caustic solution to make hypochlorite.

14. The method of claim 13, wherein a concentration of the caustic solution used is about 0.1% to about 50% caustic.

15. The method of claim 1, wherein the hypochlorite is substantially free of one or more of bromate, chlorate, or perchlorate.

16. A method for producing hypochlorite, the method comprising:
    providing a divided electrochemical cell;
    with the divided electrochemical cell, electrochemically moving chloride ions from a first brine solution in a cathode compartment to a second brine solution in an anode compartment of the divided electrochemical cell via an ion-selective membrane therebetween, wherein the first brine solution includes a plurality of dissolved salts therein including at least bromide ions, chloride ions, calcium ions, and magnesium ions, and the first brine solution is cycled through the cathode compartment only one time and the second brine solution includes one or more chloride salts;
    oxidizing the chloride ions to form chlorine gas at an anode in the anode compartment;
    circulating an anolyte comprising the second brine solution through the anode compartment while a current is applied therein to produce chlorine-containing gases including at least hypochlorous acid; and
    combining one or more displaced chlorine-containing gases with water to form hypochlorite.

17. The method of claim 16, wherein combining one or more displaced chlorine-containing gases with water to form hypochlorite includes combining the one or more displaced chlorine containing gases with salt water or another brine solution having a plurality of dissolved salts therein.

18. The method of claim 17, further comprising using the combined hypochlorite and salt water or another brine solution for bathing, cleaning equipment, or preventing marine growth in equipment.

19. The method of claim 16, further comprising purging the anolyte exiting the anolyte compartment with one or more of air or nitrogen to displace the chlorine-containing gases.

20. The method of claim 19, further comprising recapturing and recycling the air or nitrogen used to purge the anolyte product.

21. The method of claim 16, where circulating an anolyte comprising the second brine solution includes recirculating the second brine solution through the anode compartment.

22. The method of claim 16, further comprising burning at least some of the chlorine-containing gases to produce hydrochloric acid.

* * * * *